Figure 1:
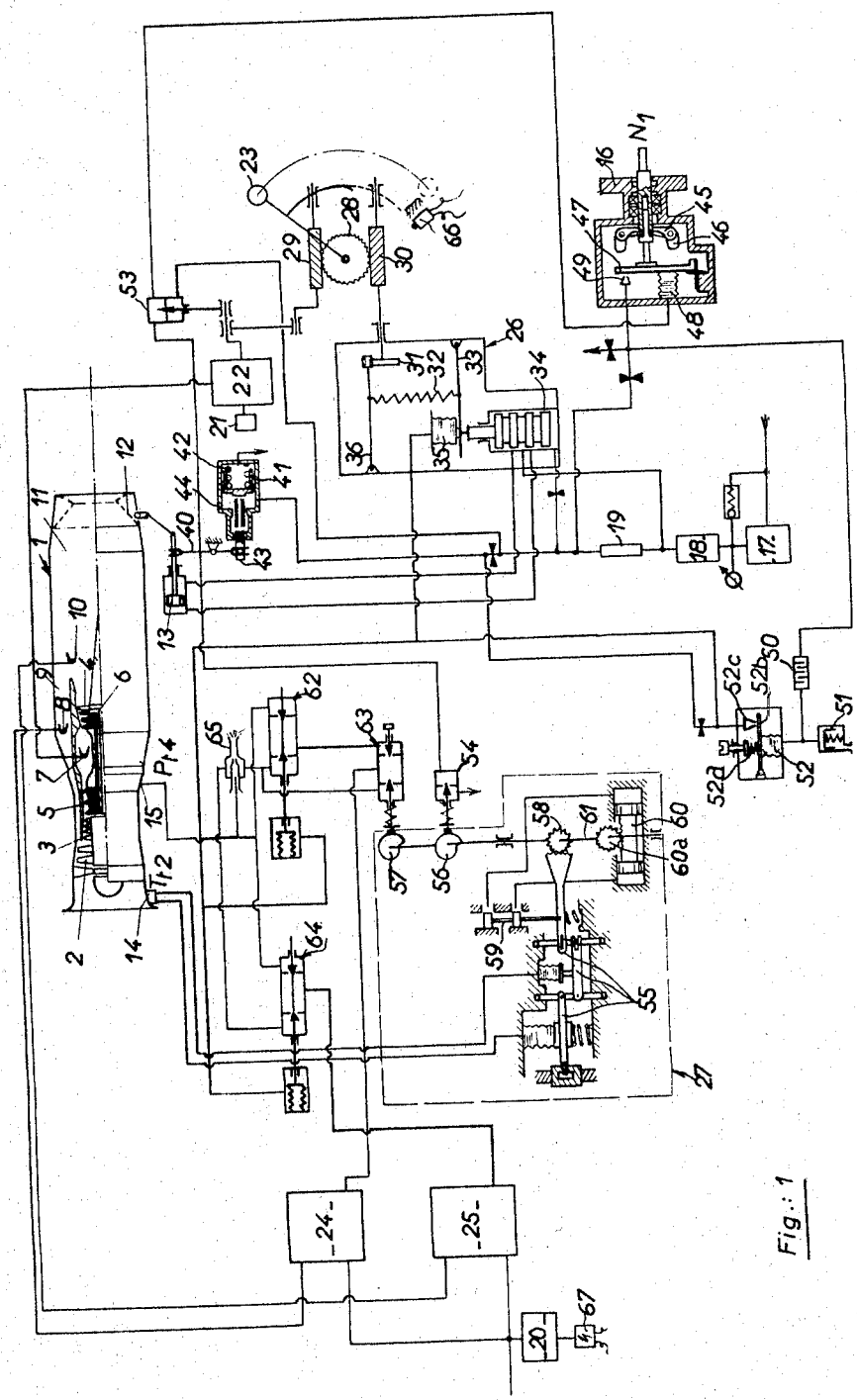

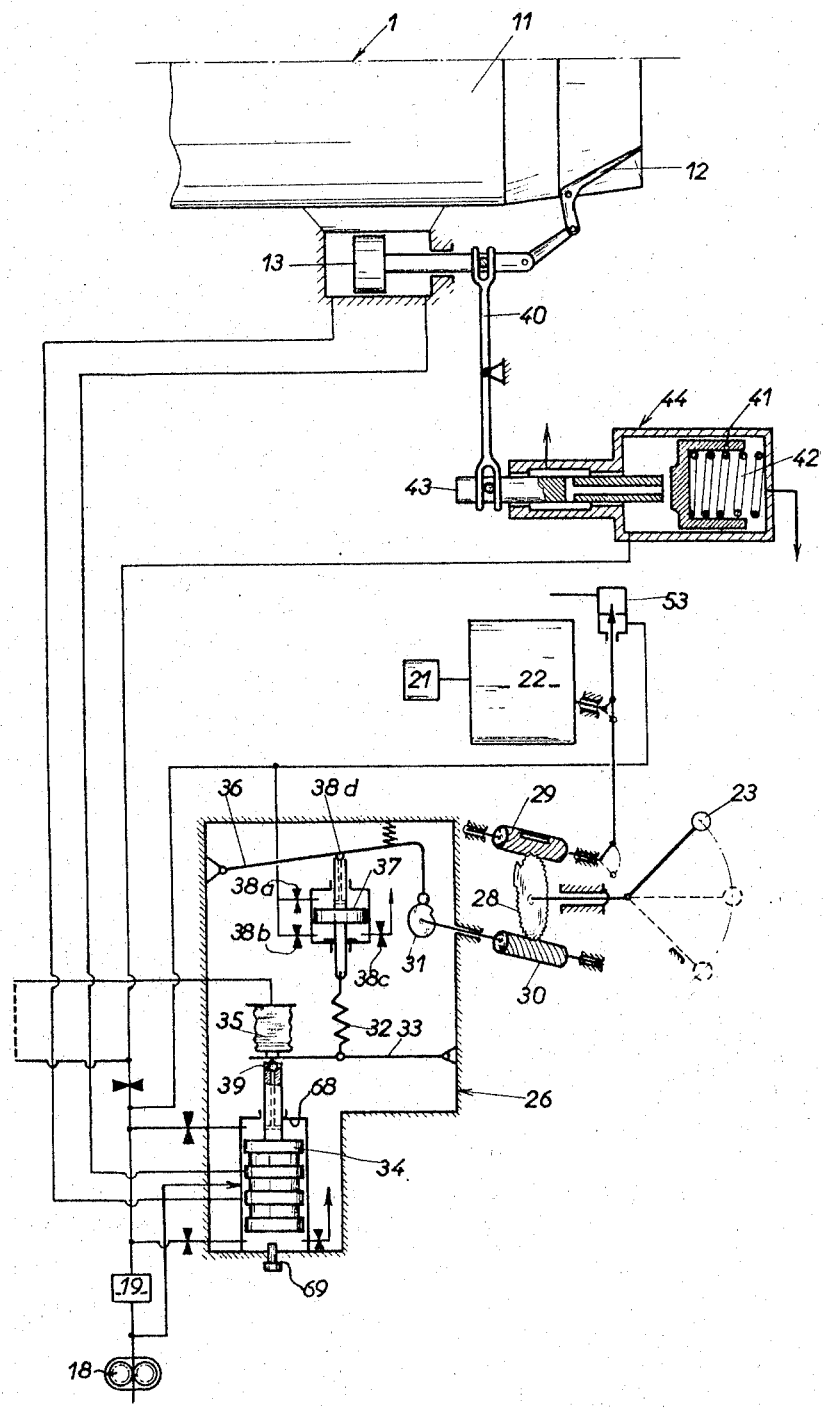

United States Patent Office 3,298,180
Patented Jan. 17, 1967

3,298,180
SINGLE-CONTROL REGULATING SYSTEM FOR AFTERBURNING BY-PASS TURBOJETS
Alfred Trinkler and Albert Stieglitz, Dammarie-les-Lys, and Louis François Jumelle, Paris, France, assignors to Societe Nationale d'Etude et de Construction de Moteurs d'Aviation, Paris, France, a company of France
Filed June 1, 1964, Ser. No. 371,314
Claims priority, application France, June 4, 1963, 936,935
8 Claims. (Cl. 60—237)

The very highly developed turbojets currently being built call for regulating systems capable of meeting all the operating requirements of such engines, alike in the "dry thrust" mode (i.e. without afterburning) and with the afterburner operative.

Such turbojets, which customarily comprise several rotors and involve a plurality of flows, are also large in size, thereby complicating correct distribution of the substantial air and fuel flow rates. Moreover, the numerous parameters involved produce certain interactions, while the degree of precision required practically imposes the use of servo controls equipped with feedback loops; furthermore, the rapid variations of some of these parameters necessitates the incorporation of damping or time-delaying devices.

Thus, in the specific case of by-pass jet engines comprising an upstream fan and combustion in the midst of the cold flow, variations in the cross-section of the jet pipe and in the rate of flow of the fuel injected into said flow strongly affect the operating conditions of the fan, which no obstacle separates from the combustion zone.

It is at all events desirable for the pilot to be relieved as far as possible of powerplant control problems—no matter how complex the engine may be. The present invention accordingly relates to a regulating system which determines the jet pipe exhaust nozzle cross-section and the various fuel flow rates, in response to a single control lever and under all flight conditions, and thus fully meets this desirable requirement.

An object of this invention is to provide a combustion regulating system wherein the jet pipe exhaust nozzle cross-section is directly governed by a hydraulic servo-control activated by said single control lever. This servo-control comprises a hydraulic feedback loop which transmits a pressure dependent upon the position of the elements used to vary the jet pipe cross-section. Said pressure is further modulated by parameters including the fan rotation speed and the stagnation temperature upstream thereof, and is applied also as a control signal to at least one afterburning fuel flow regulator. This assists synchronization between the variations in jet pipe cross-section and the adjustments in the afterburning fuel flow rates, and therefore protects the jet engine against such r.p.m. fluctuations in the low-pressure rotor as might occur during movement of the control lever and which it it desirable to reduce to negligible proportions. The "dry" combustion regulator also operates correctively on said loop, which is used continuously.

Design details appropriate to the principle of the invention hereinbefore disclosed will become clearly apparent hereinafter. It is to be noted that whilst the major part of the elements utilized are well known per se or have already been used by the applicant, their application in combination is new. It should likewise be noted that the feed-back loop includes an assisted bleed unit whose position results from a state of equilibrium of forces which are a function of the position of the throttle lever and of the position of the flaps for adjusting the exhaust nozzle cross-section, respectively. This latter force is produced by a device comprising a spring-loaded piston and a hollow rod coaxial therewith which, in conjunction with the facing head of said piston, determines a variable restriction upstream of which the pressure is thus rendered proportional to the position of the rod. Alternatively, recourse could be had to a solid rod coaxial with a piston which is provided with an orifice having a port before said rod, whereby to form the restriction of variable cross-section.

The description which follows with reference to the accompanying non-limitative exemplary drawings will give a clear understanding of the various particularities of the invention and of the art of carrying them into practice.

In the drawings:

FIGURE 1 is an overall diagram of a regulating system according to the invention; and FIGURE 2 shows in greater detail the parts constituting the jet pipe servo-control system proper.

Referring to the drawings filed herewith, there is shown thereon a turbojet 1 comprising a front fan 2 and a low-pressure compressor 3 driven by a low pressure turbine 4, and a high-pressure compressor 5 driven by a high-pressure turbine 6. The combustion chamber comprises, solely for illustrative purposes, a burner 7. A combustion system, represented by way of indication by a preheater burner 8, is mounted in a peripheral passage 9 which leads the cold by-pass flow directly from the fan 2 to an afterburner system represented by way of example by a burner 10. The jet pipe exhaust nozzle 11 is equipped with adjustable flaps or like means 12 controlled by at least one hydraulic jack comprising a double acting piston 13.

Several functional parameters of the turbojet are sensed and utilized for regulating the latter. A sensor 14 furnishes a signal which is a function of the stagnation temperature at the inlet end of the fan 2. A duct 15 bleeds air at the output pressure $P_{t4}$ from the high-pressure compressor 5 or, alternatively, at the output pressure $P_{t3}$ from the low-pressure compressor 3 for the by-pass flow afterburner regulator, and also at the pressure $P_{t4}$ for the primary flow afterburner regulator.

The low-pressure rotor is connected to an element which is responsive to its rotation speed $N_1$ in the form of a hydraulic detector 16.

In addition to a customary set of low and high pressure oil pumps 17 and 18 and a pressure reducer 19 feeding the jet pipe servo-control device, FIGURE 1 of the accompanying drawings show a fuel pump 20 for supplying the afterburner injector banks 8, 10 and a further pump 21 for supplying the combustion chamber burners 7.

A flow regulator 22 of any convenient type feeds said combustion chamber and, as will become clearly apparent hereinbelow, is governed by a single throttle control 23 and, subsidiarly, by the high-pressure rotor r.p.m. value $N_2$, by the output pressure $P_{t4}$ from the high-pressure compressor 5 and by the stagnation temperature $T_{t2}$ at the inlet end of the fan 2.

A further flow regulator of known type feeds the burners 8 and 10. In point of fact, this regulator is subdivided, again by way of an example of the invention, into a first regulator 24 which is governed by the throttle lever when the same lies in the "after-burner" portion of its travel, by $P_{t4}$ or $P_{t3}$ and by $T_{t2}$, and which controls the flow rate to the burner or set of burners 8 for preheating the gas, and into a second regulator 25 which is governed by the throttle lever and by $P_{t4}$ and which controls the afterburner flow rate proper. These regulators are fed by the pump 20.

The regulating system basically consists of a power-assisted jet pipe control unit 26, a servo mechanism 27 for processing $T_{t2}$ and a plurality of pressure modulators governed by the elements referred to precedingly and which respectively permit introducing a correction as a function of at least one parameter.

The single throttle lever 23 controls the dry thrust and the afterburner thrust sequentially by any convenient known means. By way of example, the drawing shows a mechanical control system wherein the lever 23 rotates a wheel 28 having toothed sectors meshing respectively with two worm gears 29 and 30, one of which is connected to the regulator 22 and the other to the unit 26. These two worms operate alternately, the wheel having a toothless sector projecting radially which engages in either of two longitudinal slots provided in worms 29 and 30, respectively. When a toothed sector of wheel 28 meshes with worm 29, the projecting sector engages the slot in worm 30. By rotating lever 23, wheel 28 and worm 29, driven thereby, are rotated to a position wherein the projecting sector leaves the slot in worm 30 and enters the slot in worm 29, while the toothed sectors of wheel 28 leave worm 29 and mesh with worm 30. The worm 30 bears a cam 31 which stretches, to a varying extent, a spring 32 which acts upon a control lever 33 of the jet pipe servo-control hydraulic distributor 34. A capsule 35 or like piston means acts on this lever in a countering sense.

FIGURE 2 clearly shows that the connections between the cam 31 and the spring 32 and between the lever 33 and the distributor 34 are preferably provided in the form of follow-up servo mechanisms of known type. For instance, the cam 31 is in pressure contact with a lever 36 which is followed by a piston 37. The two faces of this piston are symmetrically supplied with oil under pressure from the high-pressure pump 18 and the pressure reducer 19, through upstream restrictions 38a, 38b. Downstream of said piston are disposed, on the one hand, a fixed restriction 38c and, on the other, a variable restriction 38d consisting of a ball set with clearance into the outlet of a duct extending through the rod of piston 37 and terminating on one of the piston faces. As a result of this arrangement, any pressure exerted on the ball reduces the variable bleed flow and engenders a relative overpressure on the upper face of piston 37, which piston consequently recedes from the lever 36 until the bleed past the ball 38a restores the equilibrating pressure, the spring 32 in fact contributing to this balancing process.

In like fashion, the distributor slide-valve 34 sustains normally equal pressures against its two end faces, through the agency of a system comprising four restrictors, of which one—of the variable type—consists of a duct extending through the slide-valve rod and obturated in varying degrees by a ball 39 acting as a tracking feeler.

The distributor slide-valve 34 allows the oil under pressure from the high-pressure pump 18 to supply either face of the movable piston 13 of the actuator or actuators controlling the flap or like means 12 for adjusting the outlet section of the jet pipe 11. The rod of piston 13 is additionally connected through mechanical link means such as a lever 40 or a cable control to converter means 44 of the piston rod position (and hence of the exhaust nozzle opening) into an oil pressure valve.

Said converter means, which are also shown in FIGURE 2 on an enlarged scale, comprise a piston 41 biased by a spring 42 and a rod 43 connected to the actuator. Said rod has drilled therethrough an axial duct forming an adjusable diaphragm in cooperation with said piston, and also radial ducts having port in a chamber communicating with the oil reservoir (not shown), in like manner to the space located on the same side of piston 41 as the spring 42. Alternatively, the duct could be formed through the piston instead of the rod, which would in no way modify the operating principle.

It will be appreciated that the oil conveyed into the unit 44 and above the piston 41 can escape only by moving said piston slightly away from the rod 43, which the piston will nevertheless follow. A movement of the rod toward the piston 41 increases the oil pressure and causes the piston to recede until the force exerted by the spring 42 in its new position counterbalances the oil pressure once more. Not only is such a system stable but also highly sensitive, and since the variations in the gap between the rod and the piston are negligible the system may be said to accurately translate a position into a pressure in obedience to a proportionality law determined by the stiffness of the spring 42 and the area of the piston 41.

The control pressure modulated thus by the unit 44 and possibly corrected by a jet-and-vane system 52b, 52c reacts on the distributor slide-valve 34 of the unit 26 through the medium of the capsule 35 and the lever 33.

The feedback loop formed thus, whose ease of installation is clearly apparent, is in addition subsidiarily dependent upon the low-pressure rotor r.p.m. value $N_1$ (see FIG. 1), through the agency of the sensor 16, and also upon the position of the lever of regulator 22 (as long as "dry thrust" full throttle is not attained) as well as upon the servo-mechanism 27 responsive to the stagnation temperature $T_{t2}$ at the inlet end of the fan 2, through the agency of variable restrictions located inside pressure modulators 53 and 54, respectively.

The $N_1$ sensor 16 comprises a plate 45 rotating at a speed proportional to that of the low pressure rotor 2, 3 and on which are mounted fly-weights 46. The latter act on a rod which is coaxial with said plate and which bears against a lever 47 through a ball thrust bearing. This lever also sustains the influence of a capsule 48 and moves before a restrictor 49.

The pressure modulated thus by the restrictor 49 is exerted, through a series of thin-walled restrictions 50 and an interposed hydraulic accumulator 51, on a capsule 52 which, in conjunction with a countering calibrated spring 52a, acts upon a lever 52b. The latter moves in front of a bleed jet 52c inserted into the feedback loop of the jet pipe section servo-control system.

In addition, the linkage system connecting the worm 29 to the "dry" combustion regulator 22, or any other like linkage means connected to the latter, extends up to a pressure modulator 53 which comprises two chambers separated by a restriction which is adjustable by means of a movable needle actuated by said linkage means. One of these chambers receives oil under constant pressure and the other is connected, on the one hand, to the capsule 48 and, on the other, to an adjustable restriction internal to a further modulator 54 actuated by the servo-mechanism 27 responsive to $T_{t2}$. Thus, the position of lever 23, as well as $N_1$ and $T_{t2}$, react upon the feedback loop of the jet pipe servo-control under all circumstances and in particular when the engine is being operated without afterburning.

The servo-mechanism 27 basically comprises a linkage 55 subjected to the influence of two possibly spring-compensated capsules which are under the dependency of the stagnation temperature detected by the sensor 14. This linkage rotates a set of cams 56, 57 supported on a shaft 61. In actual fact said linkage moves a slide-valve 59 for distributing pressurized fluid to one of the two faces of a rack-like piston 60 meshing with a pinion 60a rigid with the shaft 61. On this same shaft a further pinion 58 rotates a toothed sector rigid with the linkage 55, and this system jointly constitutes a mechanical feedback loop.

The cam 56 cooperates with a spring-loaded feeler rigid with the needle of the variable restriction of the modulator 54 referred to precedingly.

The cam 57 cooperates with a further spring-loaded feeler rigid with the needle of a pressure reducing modulator 63 placed in series with a further pressure reducer 62. These pressure reducers 62 and 63, in that order, introduce into the regulator 24 of the burner or burners 8 mounted in the path of the cold flow 9, prior to mixture with the hot flow, signals which are functions respectively of the modulated pressure in the feedback loop of the jet pipe servo-control and of $P_{t4}$, on the one hand (through the action of pressure reducer 62), and of $T_{t2}$, on the other hand (through the action of pressure reducer 63).

A similar pressure reducer 64 introduces the modulated pressure prevailing in the jet pipe servo-control feedback loop, together with the pressure $P_{t4}$, into the afterburner regulator 25 which controls the fuel flow to the burner or burners 10.

The three pressure reducers 62 through 64 hereinbefore referred to act as modulators of the air pressure $P_{t4}$. Each reducer may consist for instance of three coaxial chambers separated by two restrictions which are adjustable in opposition by means of two conical needles of opposed sense which may be interconnected by a common rod and actuated by a capsule. One of their end chambers (the left-hand one in FIG. 1) is in relation with an ejector 65 which maintains therein a negative pressure sufficient for the gas jet controlled by the restriction and issuing from the central chamber to be invariably sonic, in consequence whereof the conditions prevailing downstream of said restriction cannot affect the upstream part. The other end chamber (the right-hand one in FIG. 1) receives the pressure to be modulated, and the modulated pressure prevailing in the middle chamber is applied to the element located immediately downstream in the control sequence. Thus, the middle pressure in pressure reducer 62 is applied to the high-pressure chamber of pressure reducer 63, the middle pressure of which is in turn applied to the regulator 24. It will be noted that whereas the movement of the dual needles of 62 and 64 is effected under the dependency of means responsive to the modulated pressure of the jet pipe servo-control feedback loop, the pressure reducer 63 comprises two distinct needles, to wit a manually adjustable upstream needle and a downstream needle responsive $T_{t2}$ (through the medium of the cam 57).

Stops 68, 69, etc., or like known travel limiting means are associated to the movable elements 34, 52b, 42 and 47 forming part of the hydraulic feedback loop. This permits of limiting the corrective action of said loop and enables the system for controlling the jet pipe section and for metering the afterburner fuel flow to operate with a limitation solely in the region of the fully throttle position, thereby conferring upon the turbojet a certain degree of functional flexibility in the event of a failure.

Regardless of its apparent complexity, the system described hereinabove offers the great advantage of concretizing several interaction phenomena through control sequences permitting fine and separate adjustments. Its manner of operation will be clearly apparent to the specialist in the art from the foregoing and will not be described in detail, any more than will the constructional features of the commonplace regulators 22, 24 and 25. The system may be supplemented by a switch 66 operated by the throttle lever 23 and controlling an electrovalve 67 inserted into the fuel circuit which supplies the burners 8 and 10. Also, each of these burner sets may be divided into two banks of burners which are supplied sequentially through the agency of a plug-valve controlled mechanically, say, by an actuator 13.

It should, however, be noted that the variations in $N_1$, which may be fairly rapid, are applied to the jet pipe control through the medium of a restrictor 50 and an accumlator 51, thereby permitting the use of a highly sensitive detector without transmitting to the modulated pressure the instantaneous variations in the r.p.m. figure $N_1$, nor the oscillations or beats of the fly-weights or like means, thus making the hydraulic feedback loop more stable.

Also to be noted is the fact that the use of the parameter $T_{t2}$ makes it possible to make allowance, in regulating $N_1$, for variations occurring in the ratio of the by-pass flow rate (through the passage 9) to the main flow rate as the flight speed varies.

Lastly, it is well known that a by-pass turbojet with dual rotors is particularly sensitive to variations in the jet pipe exhaust nozzle section. Consequently, the choice according to the present invention of a system which primarily controls said exhaust nozzle section, on the basis of which section the fuel flow rates are in turn controlled, confers upon turbojets equipped therewith a degree of operating flexibility significantly higher than that of jet engines in which the jet pipe outlet section is governed by fuel flow rates, or possibly even controlled in parallel therewith and hence predeterminate for all practical purposes.

It is important to note that, when operating with the afterburner lit, the powerplant is controlled in the following order: the jet pipe exhaust nozzle section is controlled by the throttle lever and by corrective elements, after which the exhaust nozzle section in turn controls the fuel flow rate (again in conjunction with corrective elements).

Because the power available for varying it is limited, the jet pipe outlet section chosen as the primary governor sustains only relatively slow variations, so that the fuel flow rate can be made to follow up with great precision since it is easier to obtain rapid variations therein. As a result, variations in the afterburner load demand do not affect the low-pressure operating speed, thereby obviating any risk of surge or overspeeding in the event of the fuel igniting rapidly, yet the efficiency remains entirely satisfactory.

It goes without saying that the invention is by no means limited to the specific embodiments hereinbefore described, but that many modifications and substitutions of parts may be made without departing from the scope of the invention.

What we claim is:

1. In a multiflow turbojet engine having high- and low-pressure compressors and turbines, main combustion and reheat burner means fed with fuel by feed means including main combustion throttle means and at least one reheat throttle means, respectively, an adjustable area nozzle, and adjusting means for the nozzle area; a combustion regulating system comprising: a single control lever for moving a first member to control the nozzle adjusting means, and a second member to control the main combustion throttle means; reheat control means for controlling each reheat throttle means as a function of an air pressure parameter correlated with the operation of the compressors; means providing a feed-back loop for the adjusting means of the nozzle area, comprising first modulating means responsive to the nozzle area and second modulating means responsive to combustion control parameters including the rotation speed of the low pressure compressor and turbine and the stagnation temperature at the inlet end of the low pressure compressor, to jointly modulate the pressure of a pressurized control fluid; means responsive to the modulated pressure of said fluid to apply a feed-back control force to the nozzle adjusting means; and means responsive to said modulated pressure to apply a correcting control force to at least one reheat throttle means.

2. A system as claimed in claim 1, wherein said means providing the feed-back loop further comprise means responsive to the movement of the second member to modulate the pressure of the control fluid jointly with said first and second modulating means.

3. A system as claimed in claim 1, wherein the feed-back loop comprises a duct fed with the control fluid at a constant pressure through a restriction and connected to a first and a second bleed means, the first and second modulating means being adapted to control said first and second bleed means, respectively.

4. A system as claimed in claim 3, wherein the first modulating means comprises a spring loaded piston working in a cylinder to define a pressure chamber therein, which chamber is connected to said duct, a rod axially mounted through a bottom end of the chamber opposite to the piston for sliding movement responsive to the nozzle area, and having a discharge bore therethrough for the fluid in the chamber, which bore has port in face to face relation with the piston.

5. A system as claimed in claim 3, wherein the second modulating means comprises means for modulating the pressure of an auxiliary pressurized fluid, responsive to the said combustion control parameter, and means including a series of restrictions for feeding the auxiliary fluid under modulated pressure to an hydraulic accumulator and to a capsule adapted to control the second bleed means.

6. A system as claimed in claim 1, comprising limiting means in the feed-back loop, adapted to limit the feed-back control force and correcting control force when the single control lever approaches to its full throttle position.

7. In a multiflow turbojet engine having high- and low-pressure compressors and turbines, main combustion burner means fed with fuel by feed means including main combustion throttle means, preheating burner means for heating a second flow of pressurized air delivered by the low pressured compressor to a jet-pipe of the engine, fed with fuel by feed means including preheated throttle means, afterburner means fed with fuel by feed means including afterburner throttle means, an adjustable area nozzle, and adjusting means for the nozzle area; a combustion regulating system comprising: a single control lever for controlling the nozzle adjusting means and main combustion throttle means; preheating control means and afterburner control means for controlling said preheated throttle means and said afterburner throttle means, respectively, responsive to air pressure parameters correlated with the operation of the compressors; means providing a feed-back loop for the adjusting means of the nozzle area, comprising first modulating means responsive to the nozzle area and second modulating means responsive to combustion control parameters including the rotation speed of the low-pressure compressor and turbine and the stagnation temperature at the inlet and of the low-pressure compressor, to jointly modulate the pressure of a pressurized control fluid; means responsive to the modulated pressure of said fluid to apply a feed-back control force to the nozzle adjusting means; means responsive to said modulated pressure to apply a correcting control force to the preheating throttle means; means responsive to said modulated pressure to apply a correcting control force to the afterburner throttle means, and means responsive to said stagnation temperature to apply a further correcting control force to said preheater throttle means.

8. A system as claimed in claim 6, comprising sensing means adapted to rotate a shaft through a linkage, responsive to the stagnation temperature, feed-back means adapted to apply a feed-back force from the shaft to the linkage, a first cam member on the shaft, adapted to modulate the pressure of the control fluid, and a second cam member on the shaft, adapted to actuate said means responsive to the stagnation temperature to apply the further correcting control force to the preheater throttle means.

References Cited by the Examiner
UNITED STATES PATENTS

| | | | |
|---|---|---|---|
| 2,933,887 | 4/1960 | Davies | 60—35.6 |
| 3,021,668 | 2/1962 | Longstreet | 60—35.6 |

JULIUS E. WEST, *Primary Examiner.*